No. 771,733. PATENTED OCT. 4, 1904.
L. H. JOHNSON.
LOCK NUT.
APPLICATION FILED AUG. 4, 1904.
NO MODEL.

Witnesses
E. H. Stewart
N. C. McCartney

Lucian H. Johnson, Inventor.
by C. A. Snow & Co.
Attorneys

No. 771,733.

Patented October 4, 1904.

UNITED STATES PATENT OFFICE.

LUCIAN H. JOHNSON, OF BONIFAY, FLORIDA.

LOCK-NUT.

SPECIFICATION forming part of Letters Patent No. 771,733, dated October 4, 1904.

Application filed August 4, 1904. Serial No. 219,491. (No model.)

*To all whom it may concern:*

Be it known that I, LUCIAN H. JOHNSON, a citizen of the United States, residing at Bonifay, in the county of Holmes and State of Florida, have invented a new and useful Lock-Nut, of which the following is a specification.

My invention relates to lock-nuts, and has for its object to provide a suitable device of that nature having a much increased power of adjustment over the lock-nuts now in use.

The particular object consists in the provision of a bolt with a left-hand-thread groove extending over the entire operative portion of the bolt and in addition to the usual right-hand thread thereon, the groove being cut through the thread and having a much greater pitch than the thread.

Further improvements consist in the formation of a nut and washer adapted to coöperate, respectively, with the left-hand groove and right-hand threads of the bolt and provided upon their lower and upper edges, respectively, with a circular upstanding portion or shoulder, said shoulders being provided with notches into which the teeth at the opposite ends of a semicircular spring are adapted to fit to lock the nut and washer together in place upon the bolt.

A still further improvement consists in the peculiar formation of the two teeth on the semicircular spring and consists in turning the ends of the spring inward upon themselves for a slight distance and then bending said inturned ends at right angles upon themselves, thus forming projections or teeth which are located a slight distance within the spring, and thus leaving at each end of said spring a small extension which is adapted to be engaged by any kind of a pointed tool to remove the spring out of its operative position upon the nut and washer.

My invention therefore consists in the combination and arrangement of the different parts and will be readily understood from the following specification and the accompanying drawings, in which—

Figure 1:
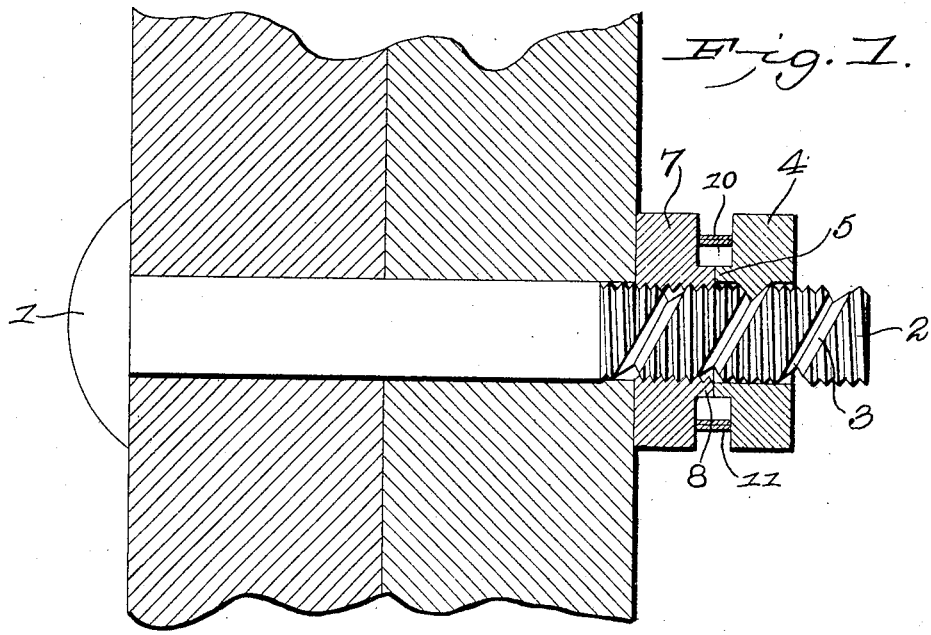
Figure 2:
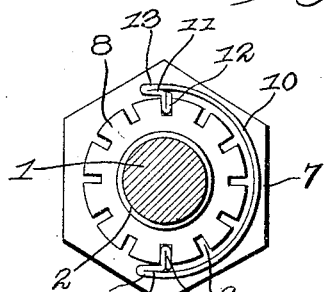
Figure 3:
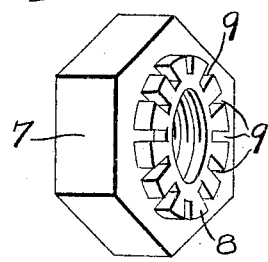
Figure 4:
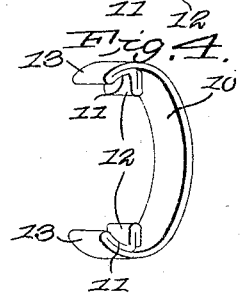
Figure 5:
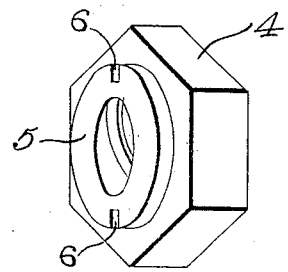

Figure 1 is a longitudinal sectional view of a nut-locking device embodying the features of the present invention. Fig. 2 shows a top plan view of the spindle with the spring in place thereon. Fig. 3 is a perspective view of the washer. Fig. 4 is a perspective view of the spring, and Fig. 5 is a perspective view of the nut.

Similar numerals refer to similar parts in all the views.

1 represents the bolt provided with the usual right-hand thread 2 and the left-hand threaded groove 3, the pitch of the latter, as stated, being much greater than that of the former. The outer nut 4 is fitted to the left-hand threaded groove 3 and has on its lower edge a circular raised portion or shoulder 5, provided with two diametrically opposite notches 6. The inner nut 7 is fitted to the right-hand thread 2, and has on its upper edge the raised shoulder portion 8, similar to shoulder 5 and provided with a series of notches 9. The spring 10 is of a semicircular shape and has its ends bent inwardly upon themselves at 11 for a slight distance, said inturned portions being then bent at right angles upon themselves to form the teeth 12 12. Said teeth are therefore located a slight distance within said spring and from the ends thereof, slight extensions 13 being thus formed at each end which are adapted to be engaged by any pointed tool to remove either tooth 12 from its corresponding notches. Since the diameter of the circular portions 5 and 8 is less than that of the nuts 4 7, which are of hexagonal shape, the spring 10, fitting in place within said nut and washer, is therefore completely protected thereby, and consequently there is less danger of its accidental dislocation.

Owing to the fact that the left-hand-thread groove is cut in the right-hand threads and that both in consequence extend over the same surface, so to speak, of the bolt 1, a much increased amount of adjustment exists over the bolts now in use, (in which the left-hand thread is simply a continuation of the right-hand thread and in which consequently the locking range is confined to these limits,) since in the present device both nuts are together adjustable to any point on the operative surface of the bolt and can be locked in such position by the toothed spring.

The operation of my device is very simple and readily understood, consisting merely in moving the nuts to the required position upon the bolt and then in fitting the teeth 12 of the spring 10 into the mating notches of the raised shoulders on said nuts, the teeth being of such a size as to fit the entire continuous slot formed by the mating notches. To unlock the device, any pointed tool is inserted back of either extension 13 of the spring and the adjacent tooth easily removed from its notch and the spring then readily removed and the outer nut first and then the inner nut unscrewed in the usual manner.

Modifications and slight changes within the scope of the invention and claims are possible, and I do not limit myself to the exact details described.

Having thus described the invention, what is claimed is—

1. The combination of a threaded bolt having a spiral groove in the threaded portion thereof and leading reversely to the direction of the threads, nuts fitted respectively to the threads and the spiral groove and provided upon their adjacent faces with raised mating portions having notches, and a bowed spring embracing the mating portions and provided with teeth engaging notches of the mating portions to interlock the two nuts.

2. The combination of a threaded bolt having a spiral groove in the threaded portion thereof and leading in a direction reverse to the threads, a pair of nuts fitted to the threads and the groove respectively and provided upon their adjacent faces with circular mating portions for mutual contact, each raised portion being provided with notches, and a bowed spring embracing the raised portions and having its ends bent back upon the inner side of the spring and then bent at substantially right angles thereto to form teeth for engagement with the notches of the raised portions to interlock the nuts.

3. The combination of a threaded bolt having a spiral groove formed in the threaded part thereof and leading in a direction reverse to that of the threads, a pair of nuts respectively fitted to the threads and the spiral groove and provided upon their adjacent faces with raised mating contacting portions having notches, and a semicircular locking-spring embracing the raised portions with its ends bent back upon the inner side of the spring and then bent at substantially right angles thereto to form teeth engaging the notches of the raised portions to interlock the nuts.

4. The combination of a threaded bolt having a spiral groove in the threaded portion thereof and leading in a direction reverse to that of the threads, a pair of nuts fitting the threads and the groove respectively and provided upon their adjacent faces with circular raised mating portions having registered notches in their peripheries, and a bowed spring embracing the raised portions and provided with teeth located inwardly from the respective ends of the spring and disposed to engage registered notches of the nuts to interlock the same, the extremities of the spring beyond the teeth constituting extensions for use in prying the teeth out of the notches.

5. In a device of the kind described, a semicircular spring locking member having a pair of diametrically opposite teeth on the inner side of said member, said teeth being located a short distance from each end of said member.

6. In a lock-nut, a semicircular spring locking member having its ends bent inwardly upon themselves a slight distance, said inturned ends being then bent at right angles to form teeth.

In testimony that I claim the foregoing as my own I have hereto affixed my signature in the presence of two witnesses.

LUCIAN H. JOHNSON.

Witnesses:
W. R. MILLER,
JAMES M. MILLER.